United States Patent
Mohrfeld

(10) Patent No.: US 9,446,821 B1
(45) Date of Patent: Sep. 20, 2016

(54) PORT AND PLUG SYSTEM FOR SUBSEA EQUIPMENT

(71) Applicant: Austin Mohrfeld, Tomball, TX (US)

(72) Inventor: Austin Mohrfeld, Tomball, TX (US)

( * ) Notice: Subject to any disclaimer, the term of this patent is extended or adjusted under 35 U.S.C. 154(b) by 0 days.

(21) Appl. No.: 14/719,235

(22) Filed: May 21, 2015

(51) Int. Cl.
*B63B 21/27* (2006.01)
*B63B 13/00* (2006.01)
*B63B 21/50* (2006.01)

(52) U.S. Cl.
CPC ............... *B63B 21/27* (2013.01); *B63B 13/00* (2013.01); *B63B 21/50* (2013.01)

(58) Field of Classification Search
CPC ........ B63B 13/00; F16L 55/10; F16L 55/12; F16L 55/136
USPC ........... 114/183 R, 197, 198; 138/89, 90, 93; 405/169, 170, 171
See application file for complete search history.

(56) References Cited

U.S. PATENT DOCUMENTS

| | | | |
|---|---|---|---|
| 3,610,337 A | 10/1971 | Lewis | |
| 3,857,414 A * | 12/1974 | Richardson | F16L 55/10 138/90 |
| 4,318,641 A | 3/1982 | Hogervorst | |
| 5,307,841 A * | 5/1994 | Condon | F16L 55/132 138/89 |
| 6,237,639 B1 * | 5/2001 | Jougla | B63B 13/00 114/197 |
| 6,719,496 B1 | 4/2004 | Von Eberstein | |
| 6,732,762 B2 | 5/2004 | Russell | |
| 7,527,455 B2 | 5/2009 | Raines | |
| 7,621,059 B2 | 11/2009 | McCoy, Jr. | |
| 7,661,905 B2 | 2/2010 | Alhayari | |
| 7,766,046 B2 | 8/2010 | Syse et al. | |

* cited by examiner

*Primary Examiner* — Lars A Olson
(74) *Attorney, Agent, or Firm* — Andrew W. Chu; Craft Chu PLLC

(57) ABSTRACT

The system for sealing subsea equipment includes a port tube, having a test port hole and a curved slot, a test port plug mounted in the test port hole, an insert body having an insertion tip portion, a middle sealing portion, and a base portion, an insert stem engaged to the base portion, a top cap engaged to the insert body, and a sealing device mounted around the insert body and in sealing engagement with the port tube. A locked configuration corresponds to a locking arm of the top cap at a terminal end of the curved slot. A set configuration corresponds to compression of the sealing device by actuation of the insert body by the plug stem. The sealing device aligns with the test port plug in the set configuration so as to allow verification of sealing engagement of each seal ring and the port tube.

20 Claims, 5 Drawing Sheets

PORT AND PLUG SYSTEM FOR SUBSEA EQUIPMENT

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to inserts and ports for subsea equipment. More particularly, the present invention relates to a plug and port system with a verifiable seal and improved durability. Even more particularly, the present invention relates to a plug and port system for a subsea anchor, such as a suction pile.

2. Description of Related Art Including Information Disclosed Under 37 CFR 1.97 and 37 CFR 1.98.

Oil and gas can be located beneath inland waters and offshore areas. The oil and gas industry uses subsea equipment for the exploration, drilling and development of these fields of oil and gas in underwater locations. The subsea equipment must withstand extreme environmental conditions, and the installation of the subsea equipment must be performed remotely. Robotic devices, such as a remote operated vehicle (ROV), interact with the equipment and tools at the subsea location. The verification of seals and connection of equipment is necessary, but the manual interaction and inspection by an ROV is limited. When subsea equipment is permanently or semi-permanently installed in an underwater location, the verification of seals and connections and the longevity of these seals and connections become vital parts of establishing safe and responsible conditions for oil and gas exploration and production.

One example of subsea equipment is the suction pile. The suction pile has a port, and an ROV connects a hose to the port through an adapter in order to suction the water from inside the suction pile. After the suction is completed, the port needs to be capped by a plug. An adapter and plug are inserts that interact with the port of the subsea equipment. Different functions, such as suctioning and capping the suction pile, are required for subsea installations.

Various prior art references establish the overall process of installing suction piles and identify the need for a plug and/or an adapter in a port of a suction pile. U.S. Pat. No. 4,318,641, issued to Hogervorst on Mar. 9, 1982, teaches a system and method for securing a suction pile to the bottom of the ocean. The general steps of lowering and opening vents to evacuate the suction pile are disclosed. U.S. Pat. No. 6,719,496, issued to Von Eberstein on Apr. 13, 2004, also describes the process of deploying a suction pile. The valves and ports for use by a remote operated vehicle (ROV) are also disclosed. The ports are actually prior art butterfly valves without any particular engineering beyond a generic butterfly valve. U.S. Pat. No. 7,527,455, issued to Raines on May 5, 2009, discloses another installation with the innovation being a split cylinder of the suction pile and a two-way flow valve on the top half of the split cylinder.

U.S. Pat. No. 7,661,905, issued to Alhayari on Feb. 16, 2010, further describes an installation process with holes in the bottom skirt of the suction pile. The process of covering the holes in the overall sequence is the scope of this patent. The pumping from ports on the top of the suction pile is shown with generic structures. Only generic plugs and butterfly valves are shown.

The prior art plugs include a sealing member. U.S. Pat. No. 7,766,046, issued to Syse et al on Aug. 3, 2010, describes a plug for sealing pipelines. The shape and components of the plug include the conical head, spring loaded mechanics, and a sealing cam, similar to an O-ring. FIGS. 1 and 5 show the sealing element 42 on the conical surface 40 of U.S. Pat. No. 7,766,046. U.S. Pat. No. 3,610,337, issued to Lewis on Oct. 5, 1971, discloses a tube unloader with slotted engagement. The structures for aligning two tubular members, inserting, and rotating to lock the two tubular members are shown.

The prior art plugs and adapters have problems. There is torque limitation of the remote operated vehicle (ROV). There is a limited amount of torque available to tighten the handle and compress the seal of the plug or adapter. The large rubber mass in the prior art sealing members does not squeeze or deform enough to get a perfect seal on the outside and inside sealing surfaces. Across the large rubber mass, only certain portions are forming a seal. The portions are inconsistent and unpredictable according to the twisting through the large rubber mass. Twisting the single rubber mass cocks or skews the plug so the seal is poor or incomplete. Twisting may require torque that is not available with an ROV. Furthermore, there is no verification. The large rubber mass may or may not form a sealing engagement, and the exact location is unknown. There are no checks on the port to determine the location or confirmation of an actual seal.

It is an object of the present invention to provide an embodiment of a system for sealing subsea equipment.

It is an object of the present invention to provide an embodiment of a plug and port system for sealing subsea equipment.

It is another object of the present invention to provide an embodiment of a system for sealing subsea equipment with verified seal.

It is still another object of the present invention to provide an embodiment of a system for sealing subsea equipment with a sealing means verified at different positions on the port.

It is an object of the present invention to provide an embodiment of a system for sealing subsea equipment with a sealing means having modular elements.

It is another object of the present invention to provide an embodiment of a system for sealing subsea equipment with a sealing means resistant to torsion during installation in a port.

It is still another object of the present invention to provide an embodiment of a system for sealing subsea equipment with a longer lasting sealing engagement to the port.

It is yet another object of the present invention to provide an embodiment of a system for sealing subsea equipment with verified sealed configuration for separate modular elements of the sealing means.

It is yet another object of the present invention to provide an embodiment of a system for sealing subsea equipment with a sealing means of seal rings and separate verification of the sealing engagement of each seal ring.

It is an object of the present invention to provide an embodiment of a system for sealing subsea equipment with a locked configuration and a set configuration, wherein the sealing means is compressed in the set configuration.

It is another object of the present invention to provide an embodiment of a system for sealing subsea equipment with a locked configuration corresponding to fixed position in the port tube.

It is still another object of the present invention to provide an embodiment of a system for sealing subsea equipment with a separate set configuration to seal separate from the locked configuration.

These and other objects and advantages of the present invention will become apparent from a reading of the attached specification and appended claims.

SUMMARY OF THE INVENTION

Embodiments of the present invention include a system for sealing subsea equipment, such as a suction pile. Before the suction pile is anchored on the sea floor, the inlets and outlets are used to suction water through the suction pile. After the suction pile is anchored on the sea floor, the inlets and outlets of the suction pile must be sealed. The present system is compatible with the various ports on the inlets and outlets of subsea equipment. The system can be installed by an ROV or other remotely operated devices. The system includes a port tube, having a test port hole and a curved slot, a test port plug mounted in the test port hole, an insert body having an insertion tip portion, a middle sealing portion, and a base portion, an insert stem engaged to the base portion, a top cap engaged to the insert body, and a sealing means mounted around the insert body and in sealing engagement with the port tube. The system can be a plug or an adapter to the port. The sealed connection is between the plug and the port or the adapter and the port.

The port tube has a distal end and a proximal end. The curved slot has an opening at the distal end and a terminal end toward the proximal end of the port tube. The test port hole is closer to the proximal end than the curved slot. The cylindrical body defines an interior volume. The proximal end of the port tube can be engaged to the subsea equipment so as to form a fluid connection between the interior volume of the cylindrical body and the subsea equipment. Sealing the interior volume seals the subsea equipment. An adapter can have attachments, such as hoses to be in fluid connection with the subsea equipment through the adapter.

In some embodiments, the insert stem is comprised of a tubular member having a first end and a second end. The first end connects to the base portion of the insert body, and the second end extends outside the distal end of the port tube. The first end is in threaded engagement to the base portion of the insert body. The second end can have a handle element, wherein rotation of the handle element rotates the insert stem. Rotating the insert stem can raise or lower the insert body relative to the top cap.

In some embodiments, the top cap is comprised of a lower housing and an upper plate. The lower housing is a cylindrical member with an exterior surface. The lower housing engages the base portion of the insert body and has a locking arm extending orthogonal to the exterior surface. The locking arm aligns with the curved slot of the port tube, so that rotation of the insert body relative to the port tube corresponds to position of the locking arm within the curved slot. The lower housing also has a locking means for the top cap and the insert body. The locking means prevents rotation of the insert body within the top cap, so that rotating the insert stem raises and lowers the insert body, instead of spinning the insert body.

The sealing means can be any seal ring, such as an O ring. The sealing means also include a plurality of seal rings or any modular sealing members fit around the insert body and forming a sealing engagement with the port tube. The sealing means can also be a combination of seal rings and spacers, which hold position of the seal ring relative to adjacent seal rings. The sealing means of the present invention resist torsion forces experienced by the prior art seals. The greater dimensions of the seals of the prior art cause the seal to twist, degrading the sealing engagement across the seal to the port tube. In the present invention, the seal rings can be installed without the degradation of the sealing engagement of each seal ring. The locked configuration places the sealing means without damaging the seal rings. The set configuration compresses the seal rings to form the actual seal. Unlike the prior art, the sealing and setting are separated for less damage to the seal rings and more consistent location of the seal. The present invention also allows the port tube to have test port holes to verify the sealing engagement of each seal ring.

DETAILED DESCRIPTION OF THE DRAWINGS

Figure 1:
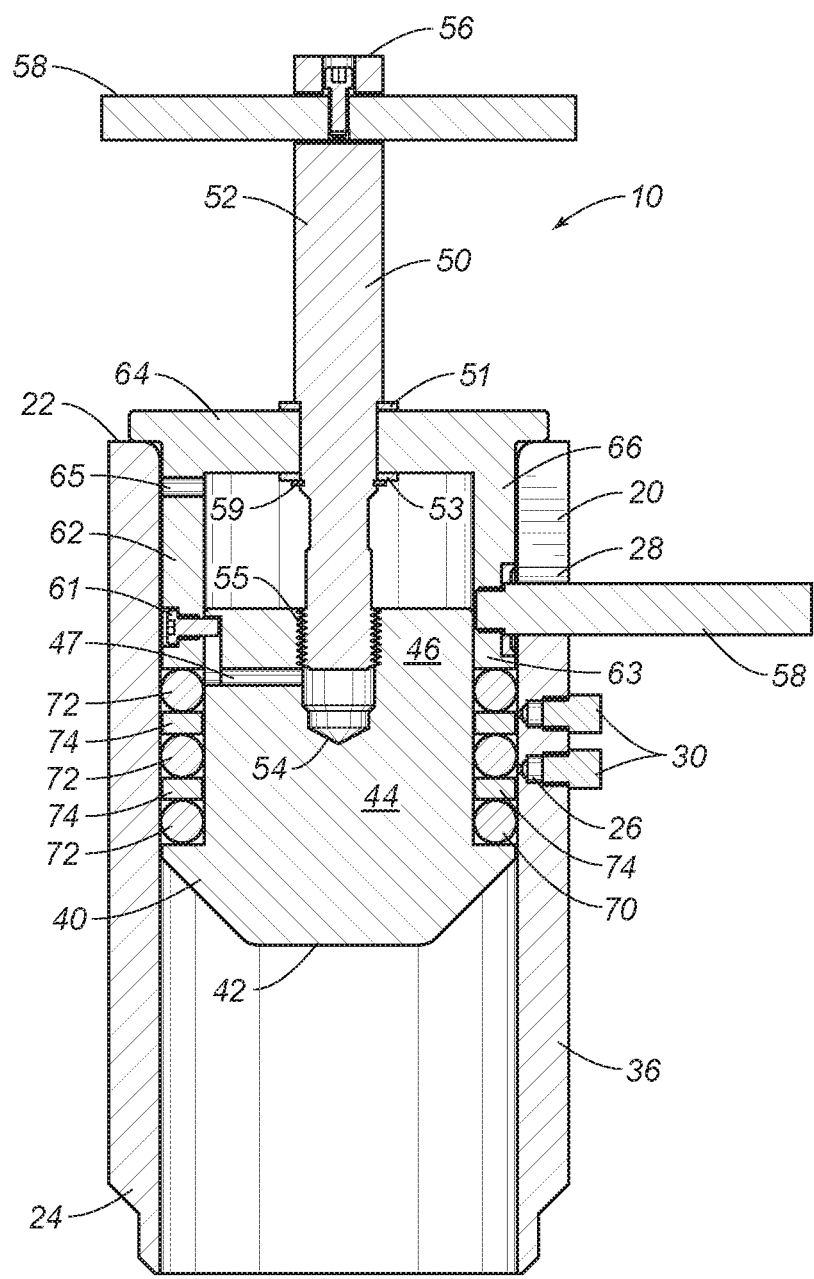
FIG. 1 is a cross-sectional view of an embodiment of the system for sealing of the present invention, showing a locked configuration for the insert as a plug.

Subsea equipment can have various inlets and outlets. Using the inlets and outlets to suction fluid from the subsea equipment or to deliver fluid to the subsea equipment requires a sealed connection to these inlet and outlet ports. Various accessories, such as hoses and tubing, can be connected to the subsea equipment. The sealed connections can be established by valves and adapters. Capping these inlets and outlets can be performed by valves, caps, and plugs. For subsea equipment, such as a suction pile, a sealed connection for adapters and a sealed connection for plugs are required. Before a suction pile is anchored on the sea floor, the inlets and outlets are actively suctioning or delivering fluid through the port. Sealed connections of the adapters for the hoses and tubing are needed. After a suction pile is anchored on the sea floor, the inlets and outlets need to be capped, so sealed connections are needed again for plugs. The embodiments of the present system are compatible with ports on these inlets and outlets of subsea equipment to form a resilient seal for plugs and adapters, which can be verified. Referring to FIGS. 1-7, embodiments of the present invention include a system 10, 110 for sealing subsea equipment. The system 10, 110 includes a port tube 20, a test port plug 30, an insert body 40, an insert stem 50, a top cap 60 engaged to the insert body 40, and a sealing means 70 mounted around the insert body 40 and in sealing engagement with the port tube 20. The system 10, 110 includes the port tube 20, 120 which can be connected to subsea equipment. Thus, sealing the system 10, 110 to the port tube 20 can seal the subsea equipment as a cap for a plug or seal subsea equipment to a hose through an adapter. The port tube 20, 120 can connect to various inlets and outlets of subsea equipment.

Figure 2:
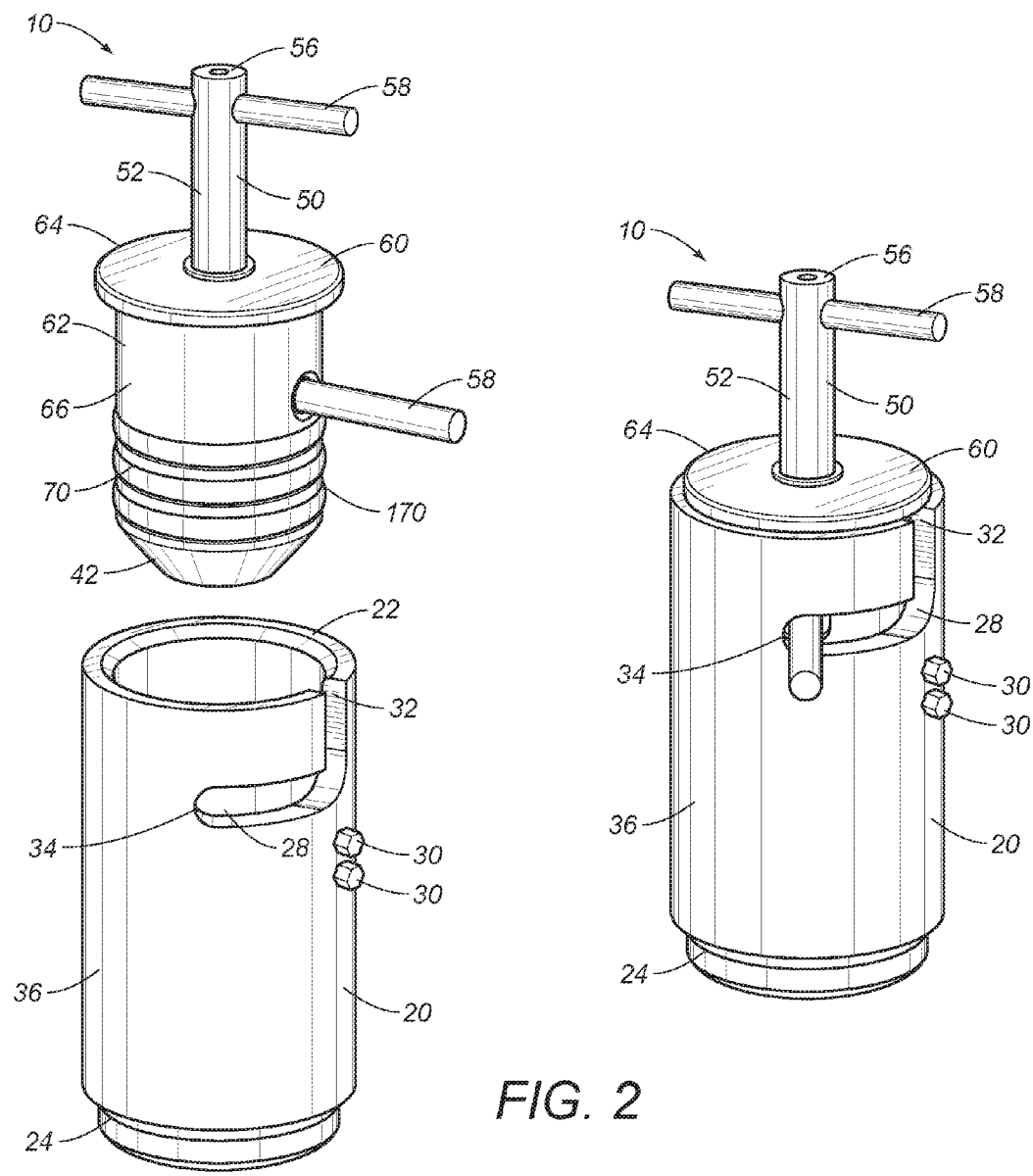
FIG. 2 is an exploded perspective view and an assembled perspective view of the embodiment of FIG. 1, showing the locked configuration in the assembled perspective.
Figure 3:
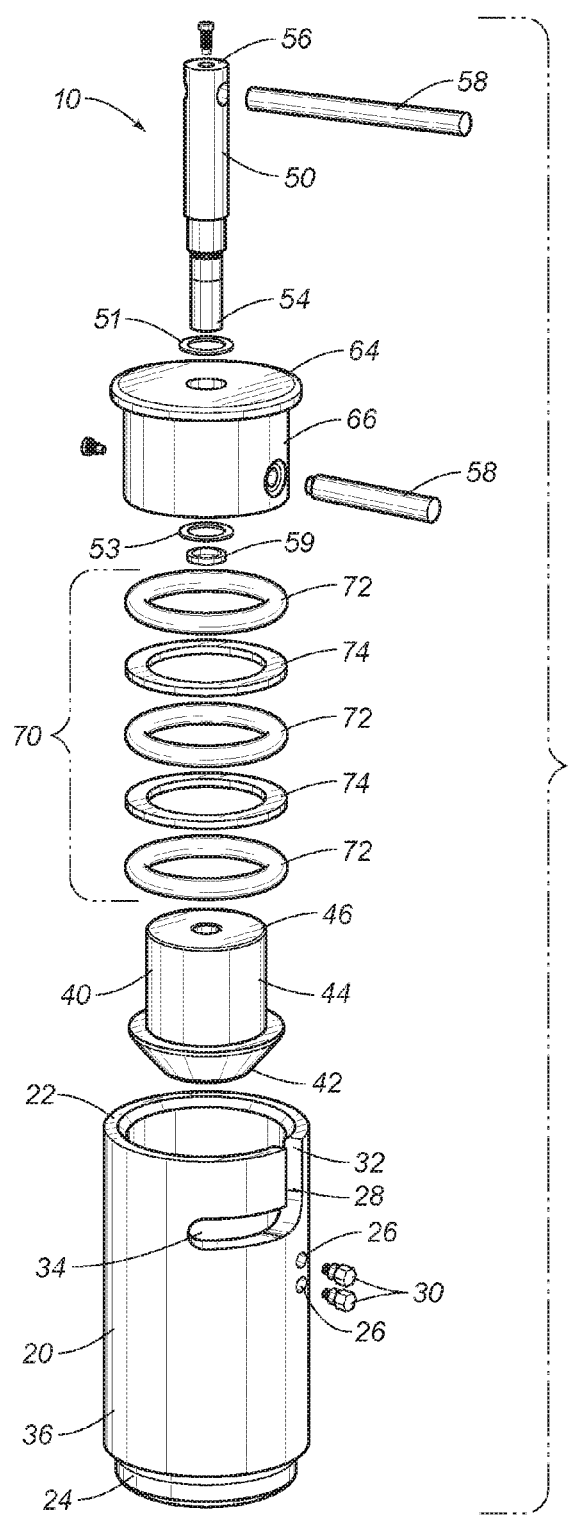
FIG. 3 is a fully exploded perspective view of the embodiment of the plug and port of FIG. 1.

FIGS. 1-3 show an embodiment of the system 10 including the port tube 20, having a distal end 22 and a proximal end 24. The port tube 20 is comprised of a test port hole 26 and a curved slot 28. The curved slot 28 has an opening 32 at the distal end 22 and a terminal end 34 toward the proximal end 24 of the port tube 20. The test port hole 26 is closer to the proximal end 24 than the curved slot 28. In some embodiments, there is a plurality of test port holes 26. The test port holes 26 are also closer to the proximal end 24 than the curved slot 28. FIGS. 2-3 show the port tube 20 being formed by a cylindrical body 36 defining an interior volume. The proximal end 24 of the port tube 20 can be mounted to the subsea equipment so as to form a fluid connection between the interior volume of the cylindrical body 36 and the subsea equipment. Sealing the interior volume seals the subsea equipment for a plug. Sealing the system 110 to the port tube connects the interior volume to a hose or tubing for an adapter. The test port plug 30 is mounted in the test port hole 26. The number of test port plugs 30 matches the number of test port holes 26, as shown in FIGS. 1-6. Each test port plug 30 allows verification of the seal at the corresponding test port hole 26. A verification can be completed at each test port plug 30 so that sealing engagement of the port tube 20 can be tested at different locations between the distal end 22 and the proximal end 24. Each test port plug 30 is accessible by an ROV for easy interaction and monitoring, when installed on the sea floor.

Figures 4, 5:
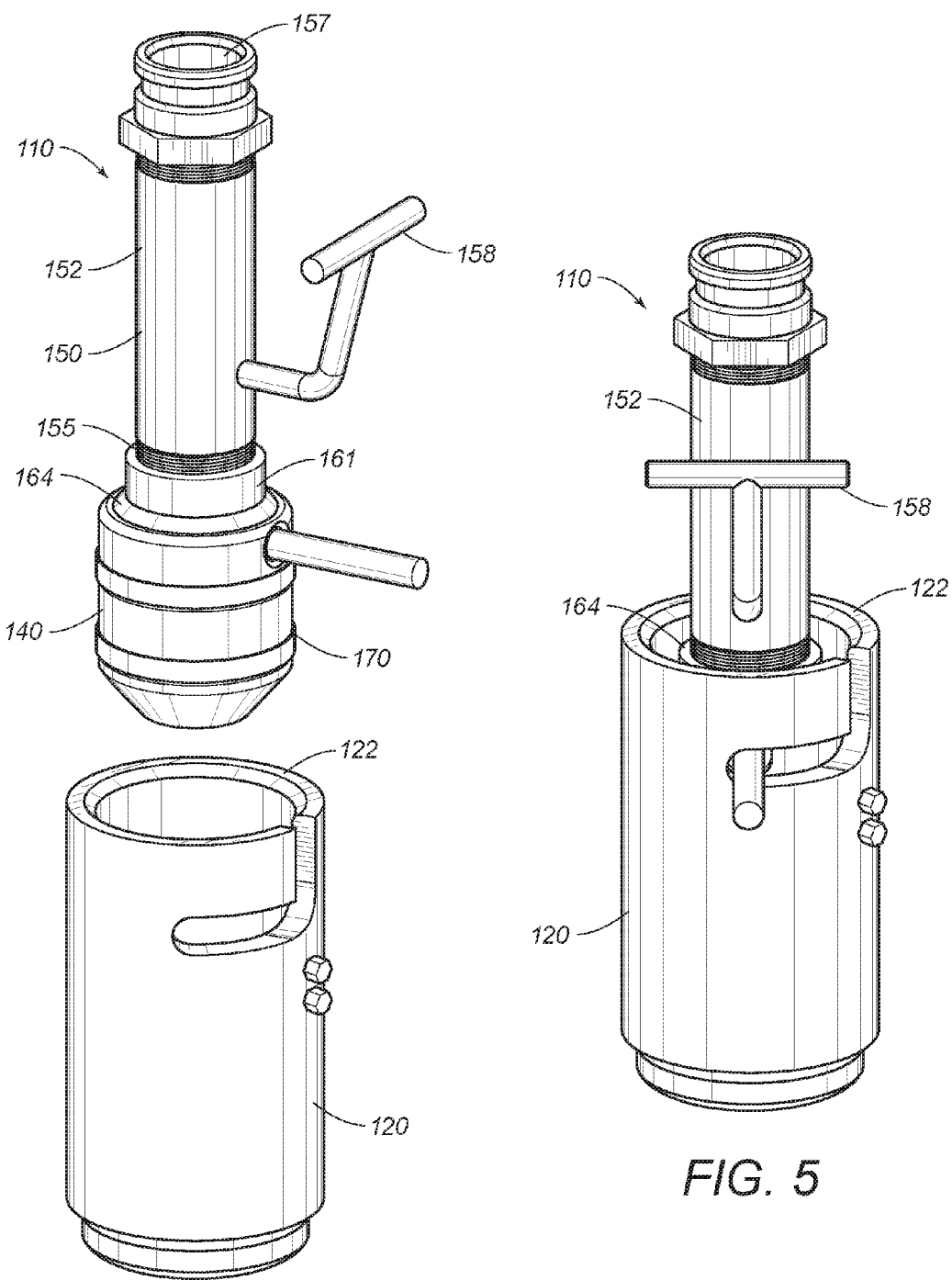
FIG. 4 is an exploded perspective view of another embodiment of the system for sealing of the present invention with the insert as an adapter.
FIG. 5 is an assembled perspective view of the embodiment of FIG. 4 in the locked configuration with the insert as an adapter.
Figure 6:
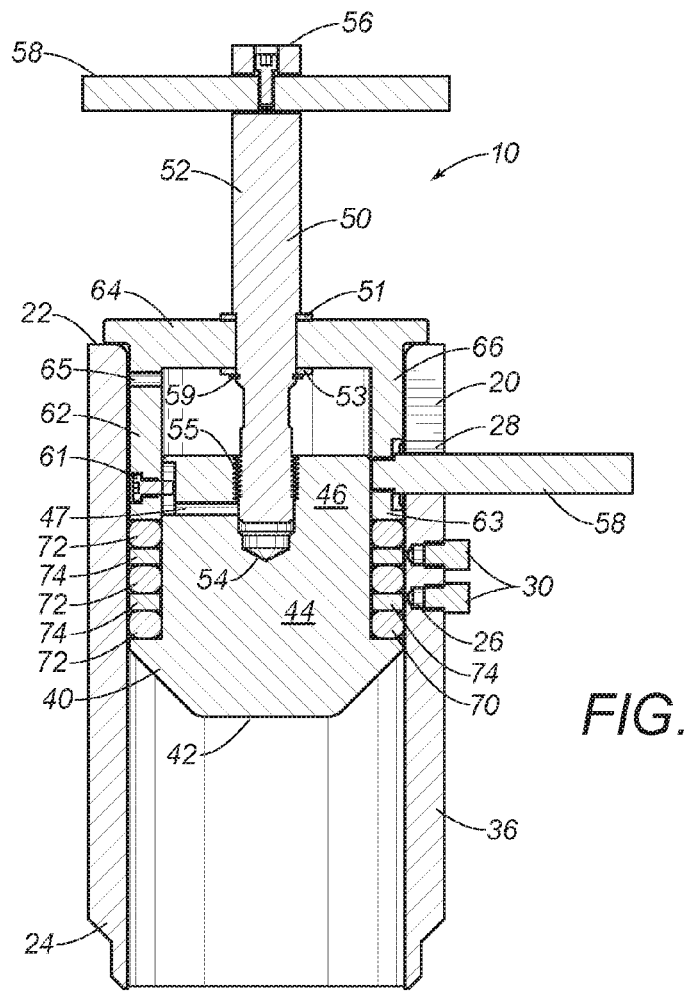
FIG. 6 is a cross-sectional view of an embodiment of the system for sealing of the present invention, showing a set configuration with the compressed sealing means.
Figure 7:
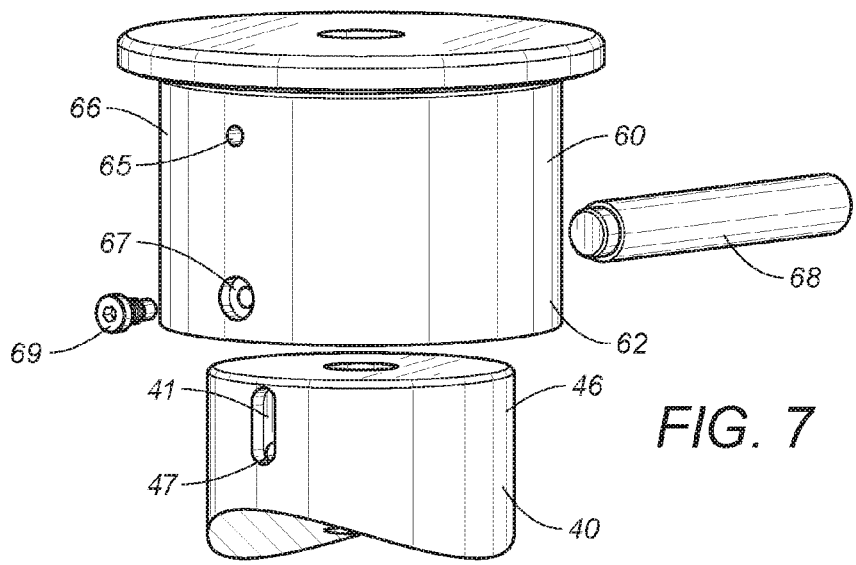
FIG. 7 is a schematic view of an embodiment of the system for sealing of the present invention, showing the top cap, insert body and insert stem.

Embodiments of the system 10 including the insert body 40 having an insertion tip portion 42, a middle sealing portion 44, and a base portion 46. The insertion tip portion 42, the middle sealing portion 44, and the base portion 46 are in oriented within the port tube 20 from the proximal end 22 to the distal end 24 of the port tube 20 in that order. The insertion tip portion 42 can be generally conical with the widest diameter at the junction to the middle sealing portion 44. The middle sealing portion 44 is generally tubular, and the sealing means 70 fit around the middle sealing portion 44. The base portion 46 is also generally tubular with a diameter greater than the middle sealing portion 44. FIG. 1 shows the top cap 60 having a bottom rim 63 facing the middle sealing portion 44 as a shoulder edge. FIGS. 1, 6 and 7 also show the base portion 46 having a fluid channel 47 for release of fluid between the insert stem 50 and the insert body 40. FIGS. 4-5 disclose an adapter so that fluid flows through the insert body 140. The structures of the insert 140 can be hollow or have channels for fluid flow so as to be compatible with a hose attached.

FIGS. 1-6 show the insert stem 50 engaged to the base portion 46 of the plug body 40. The insert stem 50 can be comprised of a tubular member 52 having a first end 54 and a second end 56. The first end 54 connects to the base portion 46 of the insert body 40 in threaded engagement 55. Rotating the piston stem 50 raises and lowers the insert body 40 relative to the top cap 60, as seen in FIG. 1 for the locked configuration and FIG. 6 for the sealed configuration. The insert stem 50 actuates the insert body 40 by the threaded engagement 55 with the base portion 46 of the insert body 40 between the locked configuration (FIG. 1) and the set configuration (FIG. 6). The insert body 40 compresses the sealing means 70 at the set configuration with the insertion tip portion 42 and the bottom rim 63 of the lower housing 62 of the top cap 60.

The second end 56 extends outside the distal end 24 of the port tube 20. Embodiments of the second end 56 can have a handle element 58, wherein rotation of the handle element 58 rotates the plug stem 50. FIGS. 2-3 show the handle element 58 as a simple cam mounted on the second end 56 of the tubular member 52. FIGS. 4-5 show an embodiment of the system 110 as an adapter with the handle element 158 as a protrusion from the tubular member 152. The handle element 158 is located on a different part of the second end 156 of the tubular member 152. The handle element 158 remains compatible with an ROV, and the particular shape can vary according to the robotic arms or manual manipulation of the insert stem 50. For the adapter, the tubular member 52 engages an attachment, such as a hose. Water from the interior of the suction pile can be suctioned through the system 110 as an adapter for a hose (not shown in FIGS. 4 and 5). In this embodiment, there is a seal between the port 120 and the system 110, but the subsea equipment is not sealed from the hose attachments to the system 110 as an adapter. FIGS. 4 and 5 show the threads 155 that can actuate the tubular member 152, analogous to the threads 55 of the insert stem 52 of FIGS. 1-3 for the system 10 as a plug.

For all embodiments, the ROV can mount the insert body 40, insert stem 50 and top cap 60 into the port tube 20 for the locked configuration. Then, the ROV can rotate the insert stem 50 to compress the sealing means 70 into the set configuration. For the embodiments of FIGS. 1-3, the set configuration is shown in FIG. 6. The placement in the port tube 20 and forming the seal to the port tube 20 are separate so that the sealing means 70 is not damaged or worn during the installation in the port tube 20, as in the prior art.

A particular embodiment of the insert stem 50 is shown in FIG. 1 with a top washer seal 51, a bottom washer seal 53, and a retaining ring 59. The top washer seal 51 mounts around the insert stem 50 and above the top cap 60. The bottom washer seal 53 mounts around the insert stem 50 and below the top cap 60. The retaining ring 59 is mounted around the insert stem 50 and below the top cap 60 and below the bottom washer seal 53 so as to form a friction fit engagement between the insert stem 50 and the top cap 60. The insert stem 50 rotates within the top cap 60 without moving the top cop 60. The plug stem 50 and the top cap 60 remain in place relative to each other, while the insert body 40 raises and lowers relative to the top cap 60.

Embodiments of the system 10 include the top cap 60 engaged to the plug body 20. The top cap 60 can be comprised of a lower housing 62 and an upper plate 64. The lower housing 62 is a cylindrical member with an exterior surface 66 and bottom rim 63. FIG. 1 shows the lower housing 62 engaging the base portion 46 of the plug body 40. The connection to the base portion 46 can be friction fit. FIGS. 1, 6 and 7 also show the lowering housing 62 having a fluid channel 65 for release of fluid between the top cap 60 and the plug body 40. Any fluid from the fluid channel 47 in the base portion 46 of the insert body 40 between the insert stem 50 and the insert body 40 collects for removal by the fluid channel 65. FIGS. 4-5 for the system 110 as an adapter, the top cap 160 has a passageway or flow channel 157 for fluid connection of the hose to the interior volume of the subsea equipment.

FIGS. 1, 6 and 7 show the locked configuration and the set configuration. The lower housing 62 of the top cap 60 can be in friction fit engagement with the base portion 46 of the insert body 40. The lower housing 62 is further comprised of a locking means 61 in FIGS. 1 and 6. The locking means 61 is shown in greater detail in FIG. 7. The locking means 61 of the lower housing 62 of the top cap 60 is comprised of a locking hole 67 in the exterior surface 66 of the lower housing and a threaded member 69. The threaded member 69 extends through the locking hole 67. FIG. 7 shows that the base portion 46 of the plug body 40 is further comprised of a locking slot 41 oriented longitudinally from the proximal end to the distal end of the port tube 20. The threaded member 49 inserts through the locking hole 67 and into the locking slot 41 so as to prevent rotation of the insert body 40 relative to the top cap 60. Rotation of the insert stem 50 does not rotate the insert body 40. Rotation of the insert stem 50 raises or lowers the insert body 40 to compress the sealing means 70 into the set configuration. There are other locking means to stop rotation of the insert body 40 relative to the top cap 60. FIGS. 1, 6 and 7 are only one embodiment, but other prior art locking means are also considered as part of the system 10 with the sealing means 70.

In the present invention, the threaded member 69 actuates within the locking slot 41 according to the insert body 40 between the locked configuration and the set configuration. Movement of the threaded member 69 within the locking slot 41 relative to the insert body 40 corresponds to actuation of the insert stem 50 by the threaded engagement 55 to the base portion 46 of the insert body 40 in this embodiment. The insert stem 50 moves the insert body 40 closer to the top cap 60 in order to compress the sealing means 70 in FIG. 6 for the set configuration. The insert stem 50 moves the insert body 40 farther from the top cap 60 in order to release compression of the sealing means 70 in FIG. 1 for the locked configuration as a plug. A locking arm 68 still holds the top cap 60 in position, even if the sealing means 70 is not yet compressed to form the seal.

FIGS. 1-6 also show the top cap 60 having the locking arm 68 extending orthogonal to the exterior surface 66. The locking arm 68 aligns with the curved slot 28 of the port tube 20, so that rotation of the plug body 40 relative to the port tube 40 corresponds to position of the locking arm 68 within the curved slot 28. The insert stem 50 inserts through the upper plate 64 of the top cap 60. FIGS. 1-3 and 6 show one embodiment of the system 10 with the upper plate 64 having a shoulder rim 61 for releasable engagement with the port tube 20. FIGS. 4-5 show another embodiment of the system 110 as an adapter with the upper plate 164 having a rim 161 aligned with the distal end 122 of the port tube 120. The system 110 as an adapter still has the locked configuration and the set configuration with the sealing means 170 and the port tube 120. The seal is the system 110 to the port tube 120, so that an attachment to the tubular member 152 of the insert stem 150 can be in fluid connection with the interior volume of the subsea equipment through the system 110.

The position of the locking arm 68 within the curved slot 28 from the opening 32 to the terminal end 34 corresponds to insertion of the plug body 40 into the port tube 20 for the locked configuration. The locked configuration is placement of the plug body 40 within the port tube 20 corresponding to the locking arm 68 at the terminal end 34 of the curved slot 28. The same locked configuration is shown in FIG. 5 for the system 110 as an adapter. For the embodiment of FIGS. 1-3 and 6 with the system 10 as a plug, the locked configuration also corresponds to the shoulder rim 61 abutted to the distal end 22 of the port tube 20.

FIGS. 1-5 show the sealing means 70 mounted around the plug body 40 and in sealing engagement with the port tube 20. The sealing means 70 can be any seal ring, such as an O ring. The sealing means 70 also includes a plurality of seal rings 72 or any modular sealing members fit around the plug body 40 and forming a sealing engagement with the port tube 20. The sealing means 70 can also be a combination of seal rings 72 and spacers 74, which hold position of the seal ring 72 relative to adjacent seal rings 72. The sealing means 70 of the present invention resist torsion forces experienced by the prior art seals. In the present invention, the seal rings 72 are installed without the degradation of the sealing engagement of each seal ring 72 to the port tube 20. FIG. 1 shows a seal ring 72 positioned at the middle sealing portion 44 of the insert body 40. FIG. 6 shows the seal ring 72 compressed at the middle sealing portion 44 of the insert body 40. The seal ring 72 aligns with the test port plug 30 so as to allow verification of sealing engagement of the seal ring 72 and the port tube 20. The cross sectional views of FIGS. 1 and 6 show the seal ring 72 positioned between the insertion tip portion 42 and the lower housing 62 of the top cap 60 in the locked configuration. In some embodiments, the seal ring 72 can be held in position by the insertion tip portion 42 of the insert body 40 and the lower housing 62 of the top cap 60. The widest portion of the insertion tip portion 42 and the shoulder edge of the bottom rim 63 of the lower housing 62 contain the sealing means 70, such as the seal ring 72, on the middle sealing portion 44.

Embodiments of the sealing means 70 include a plurality of seal rings, such as a seal ring 72 and an additional seal ring 72. Each seal ring 72 can be in sealing engagement with the port tube 20 and can be tested separate from each other. Some embodiments include a spacer 74 with the spacer 74 being mounted around the insert body 40 and between the seal ring 72 and the additional seal ring 72. When the sealing means 70 includes the seal ring 72, the additional seal ring 72, and the spacer 74, the entire sealing means 70 can be positioned between the insertion tip portion 42 of the insert body 40 and the lower housing 62 of the top cap 60. Additional spacers 74 can be included so that the sealing means 70 can be comprised of a plurality of seal rings 72 and a plurality of spacers 74.

FIGS. 1-6 shows that the port tube 20 is further comprised of additional test port holes 26 and additional test port plugs 30. Each test port hole 26 and each test port plug 30 can correspond to each seal ring 72 so as to verify each the sealing engagement of each seal ring 72 at the corresponding test port plug 30. The number of seal rings 72 can vary. The number of seal rings 72 may not match the number of test port plugs 30. However, each test port plug 30 corresponds to at least one test port hole 26 for verification of a seal ring 72.

The present invention provides an embodiment of a system for sealing subsea equipment. The system includes a plug or adapter and a port, such that the port must be incorporated on the subsea equipment. Any inlet or outlet on the subsea equipment can be adapted to include the port tube of the present invention. Subsea equipment can be retrofit or manufactured with the port tube of the present invention. No prior art port tubes have the test port holes for the test port plugs. The seals of the prior art ports to the plug or adapters are not verified as in the present invention. The suction pile is one embodiment of subsea equipment. The ports of prior art suction piles do not include the port tubes of the present invention. Suction piles do not have the system of verified sealing to the port tube as in the present invention.

The single mass of sealing member of the prior art is avoided. The torque available from an ROV is consistent and compatible with the multiple seal rings of the present invention. The amount of torque is each seal ring or O ring, not a large rubber mass. The consistent contact of the seal ring is more reliable and easier to consistently install. The present invention includes a verified sealed configuration. The sealing means of the present invention can be verified at different positions on the port tube. Multiple positions as claimed is beyond the prior art because only a single sealing member was used. There was no need for checking more than one position.

The present invention includes embodiments of a sealing means having modular elements, such as interchangeable seal rings and spacers. The modular elements resist torsion during installation in the port tube. The seal of each seal ring is not degraded by the twisting to install. The sealing engagement is more durable and lasts longer than prior art single sealing members. The verification of at different positions on the port tube coordinates with the positions of separate seal rings on the plug body. Separate verification of an individual seal ring allows for improved reliability of the sealing engagement of the present invention. The sealing engagement to the port tube is more consistent and can be verified on multiple levels.

The system for sealing subsea equipment of the present invention has a locked configuration and a set configuration. The locked configuration is mounting the insert body in the port tube to the proper depth. The set configuration is the compression of the sealing means to actually form the seal to the port tube. The mounting and sealing are separate so that the sealing means is not damaged during the installation. The prior art single mass is trying to be inserted into the tube and forming the seal at the same time, so control over the placement and orientation of the single mass is limited. The single mass can be damaged or ruptured during insertion into the port tube, so that any seal would be fragile or incomplete. The present invention avoids the difficulty of insertion to the proper location in the port tube and forming the actual seal by a controlled compression. The present structures allow for ROV installation with simple actions, such as turning the handle of the insert stem by a robotic arm. The locked configuration and the set configuration are advantages to increase the working life and quality of the subsea equipment.

The foregoing disclosure and description of the invention is illustrative and explanatory thereof. Various changes in the details of the described method can be made without departing from the true spirit of the invention.

I claim:

1. A system for sealing subsea equipment, the system comprising:
    a port tube having a distal end and a proximal end, said port tube being comprised of a cylindrical body defining an interior volume, said port tube being comprised of a test port hole in said cylindrical body and a curved slot, said curved slot having an opening at said distal end and a terminal end toward said proximal end of said port tube, said test port hole being closer to said proximal end than said curved slot;
    a test port plug mounted in said test port hole;
    an insert body having an insertion tip portion, a middle sealing portion, and a base portion, said insertion tip portion, said middle sealing portion, and said base portion being in oriented within said port tube from said proximal end to said distal end of said port tube;
    an insert stem engaged to said base portion of said insert body, said insert stem being comprised of a tubular member, said tubular member having a first end and a second end, said first end being in threaded engagement to said base portion of said insert body, said second end being extended outside said distal end of said port tube;
    a top cap engaged to said insert body, said top cap being comprised of a lower housing and an upper plate, said lower housing being a cylindrical member with an exterior surface, said insert stem inserting through said upper plate of said top cap, said lower housing engaging said insert body and having a locking arm extending orthogonal to said exterior surface and a locking means removably engaged to said base portion of said insert body; and
    a sealing means for said insert body and said port tube, said sealing means being positioned at said middle sealing portion of said insert body, said sealing means being held in position by said insertion tip portion of said insert body and said lower housing of said top cap, each seal means being aligned with each test port plug so as to allow verification of sealing engagement of said insert body and said port tube,
    wherein a locked configuration corresponds to said locking arm at said terminal end of said curved slot, and wherein a set configuration corresponds to said sealing means compressed between said port tube and said insert body.

2. The system for sealing, according to claim 1, said proximal end being engageable to the subsea equipment so as to form a fluid connection between said interior volume of said cylindrical body and said subsea equipment.

3. The system for sealing, according to claim 1, said second end having a handle element, wherein rotation of said handle element corresponds to rotation of said insert stem.

4. The system for sealing, according to claim 3, wherein said insert stem actuates said insert body by said threaded engagement with said base portion of said insert body between said locked configuration and said set configuration, said insert body compressing said sealing means at said set configuration.

5. The system for sealing, according to claim 1, wherein said insert stem is further comprised of a top washer seal, a bottom washer seal, and a retaining ring, said top washer seal being mounted around said insert stem and above said upper plate, said bottom washer seal being mounted around said insert stem and below said upper plate, and wherein said retaining ring is mounted around said insert stem and below said upper plate and below said bottom washer seal.

6. The system for sealing, according to claim 1, said upper plate of said top cap having a shoulder rim for releasable engagement with said port tube.

7. The system for sealing, according to claim 1, said lower housing of said top cap being friction fit engagement with said base portion of said insert body.

8. The system for sealing, according to claim 1, said lower housing of said top cap having a fluid channel so as to release fluid between said top cap and said insert body.

9. The system for sealing, according to claim 1, wherein said locking means of said lower housing of said top cap is comprised of a locking hole in said exterior surface of said lower housing and a threaded member, said threaded member extending through said locking hole, wherein said base portion of said insert body is further comprised of a locking slot oriented within said port tube from said proximal end to said distal end of said port tube, and wherein said threaded member inserts through said locking hole and into said locking slot so as to prevent rotation of said insert body relative to said top cap.

10. The system for sealing, according to claim 9, wherein said threaded member actuates within said locking slot according to said insert body between said locked configuration and said set configuration.

11. The system for sealing, according to claim 9, wherein movement of said threaded member within said locking slot relative to said insert body corresponds to actuation of said insert stem by said threaded engagement to said base portion of said insert body, said insert stem moving said insert body closer to said top cap in order to compress said sealing means, said insert stem moving said insert body farther from said top cap in order to release compression of said sealing means.

12. The system for sealing, according to claim 1, wherein said locking arm aligns with said curved slot of said port tube, wherein rotation of said insert body relative to said port tube corresponds to position of said locking arm within said curved slot.

13. The system for sealing, according to claim 1, wherein said locking arm aligns with said curved slot of said port tube, wherein position of said locking arm within said curved slot corresponds to insertion of said insert body into said port tube.

14. The system for sealing, according to claim 1, wherein said locking arm aligns with said curved slot of said port tube, wherein a shoulder rim abuts against said distal end of said port tube in said locked configuration.

15. The system for sealing, according to claim 1, wherein said sealing means is comprised of a seal ring mounted around said insert body and in sealing engagement with said port tube, said seal ring positioned at said middle sealing portion of said insert body, said seal ring being aligned with said test port plug so as to allow verification of sealing engagement of said seal ring and said port tube.

16. The system for sealing, according to claim 1, wherein said port tube is further comprised of additional test port holes, and wherein said sealing means is comprised of a plurality of seal rings mounted around said plug body and in sealing engagement with said port tube, said seal rings positioned at said middle sealing portion of said insert body, each seal ring being aligned with a respective test port hole so as to allow verification of sealing engagement of each seal ring and said port tube.

17. The system for sealing, according to claim 16, wherein said sealing means further comprises a spacer, said spacer being mounted around said insert body and between adjacent seal rings.

18. The system for sealing, according to claim 16, wherein said sealing means further comprises a plurality of spacers, each spacer being mounted around said insert body and between adjacent seal rings, wherein a number of spacers corresponds to a number of seal rings.

19. A system for sealing subsea equipment, the system comprising:

a port tube having a distal end and a proximal end, said port tube being comprised of a cylindrical body defining an interior volume, said port tube being comprised of a test port hole in said cylindrical body and a curved slot, said curved slot having an opening at said distal end and a terminal end toward said proximal end of said port tube, said test port hole being closer to said proximal end than said curved slot;

a test port plug mounted in each test port hole;

an insert body having an insertion tip portion, a middle sealing portion, and a base portion, said insertion tip portion, said middle sealing portion, and said base portion being in oriented within said port tube from said proximal end to said distal end of said port tube, said insert body having a flow channel in fluid connection with said port tube;

an insert stem engaged to said base portion of said insert body, said insert stem being comprised of a tubular member, said tubular member having a first end and a second end, said first end being in threaded engagement to said base portion of said insert body, said second end being extended outside said distal end of said port tube, said tubular member being in fluid connection with said port tube;

a top cap engaged to said insert body, said top cap being comprised of a lower housing and an upper plate, said lower housing being a cylindrical member with an exterior surface, said insert stem inserting through said upper plate of said top cap, said lower housing engaging said insert body and having a locking arm extending orthogonal to said exterior surface and a locking means removably engaged to said base portion of said insert body, said tubular member being in fluid connection with said port tube through said top cap; and a sealing means for said insert body and said port tube, said sealing means being positioned at said middle sealing portion of said insert body, each seal means being aligned with each test port plug so as to allow verification of sealing engagement of said insert body and said port tube, wherein a locked configuration corresponds to said locking arm at said terminal end of said curved slot, and wherein a set configuration corresponds to said sealing means compressed between said port tube and said insert body.

20. The system for sealing, according to claim 19, wherein said sealing means is comprised of:

a plurality of seal rings mounted around said insert body and in sealing engagement with said port tube, said seal rings positioned at said middle sealing portion of said insert body, each seal ring being aligned with a respective test port hole so as to allow verification of sealing engagement of each seal ring and said port tube; and a plurality of spacers, each spacer being mounted around said insert body and between adjacent seal rings, wherein a number of spacers corresponds to a number of seal rings, wherein said sealing means is positioned between said insertion tip portion of said insert body and said lower housing of said top cap.

* * * * *